US010787528B2

(12) United States Patent
Reichelt et al.

(10) Patent No.: US 10,787,528 B2
(45) Date of Patent: Sep. 29, 2020

(54) PROCESS FOR PREPARING PROPYLENE COPOLYMER COMPOSITIONS

(71) Applicant: BOREALIS AG, Vienna (AT)

(72) Inventors: Kristin Reichelt, Neuhofen/Krems (AT); Kauno Alastalo, Porvoo (FI); Klaus Nyfors, Porvoo (FI); Luigi Resconi, Neuhofen an der Krems (AT)

(73) Assignee: Borealis AG, Vienna (AT)

( * ) Notice: Subject to any disclaimer, the term of this patent is extended or adjusted under 35 U.S.C. 154(b) by 213 days.

(21) Appl. No.: 16/067,170

(22) PCT Filed: Dec. 27, 2016

(86) PCT No.: PCT/EP2016/082725
§ 371 (c)(1),
(2) Date: Jun. 29, 2018

(87) PCT Pub. No.: WO2017/114840
PCT Pub. Date: Jul. 6, 2017

(65) Prior Publication Data
US 2019/0010263 A1    Jan. 10, 2019

(30) Foreign Application Priority Data
Dec. 31, 2015  (EP) .................................... 15203225

(51) Int. Cl.
C08F 210/06    (2006.01)
C08J 5/18      (2006.01)
(Continued)

(52) U.S. Cl.
CPC ............ C08F 210/06 (2013.01); C08F 2/001 (2013.01); C08F 2/01 (2013.01); C08F 2/12 (2013.01);
(Continued)

(58) Field of Classification Search
USPC ........................................................... 526/65
See application file for complete search history.

(56) References Cited

U.S. PATENT DOCUMENTS 4,107,414 A    8/1978  Giannini et al.
4,186,107 A    1/1980  Wagner
(Continued)

FOREIGN PATENT DOCUMENTS

EP    45975 A2    2/1982
EP    45976 A2    2/1982
(Continued)

OTHER PUBLICATIONS

International Search Report and Written Opinion dated Mar. 16, 2017 by the International Searching Authority for International Application No. PCT/EP2016/082725, filed on Dec. 31, 2015 and published as WO 2017/114840 on Jul. 6, 2017 (Applicant—BOREALIS AG) (7 Pages).
(Continued)

Primary Examiner — Fred M Teskin
(74) Attorney, Agent, or Firm — Ballard Spahr, LLP

(57) ABSTRACT

The present invention relates to an olefin polymerization process for producing propylene copolymer composition (P), wherein propylene, $C_4$ to $C_{10}$ α-olefin and optionally ethylene are reacted in the presence of a Ziegler-Natta catalyst in a multistage polymerization process comprising at least two polymerization reactors, wherein the copolymer composition is bimodal with respect to the content of $C_4$ to $C_{10}$ α-olefin and, if present, to ethylene. Further, the invention is directed to the propylene copolymer composition being bimodal with respect to the content of $C_4$ to $C_{10}$ α-olefin and optionally to ethylene, and use of said propylene copolymer compositions for producing articles.

17 Claims, 2 Drawing Sheets

Figure 1:
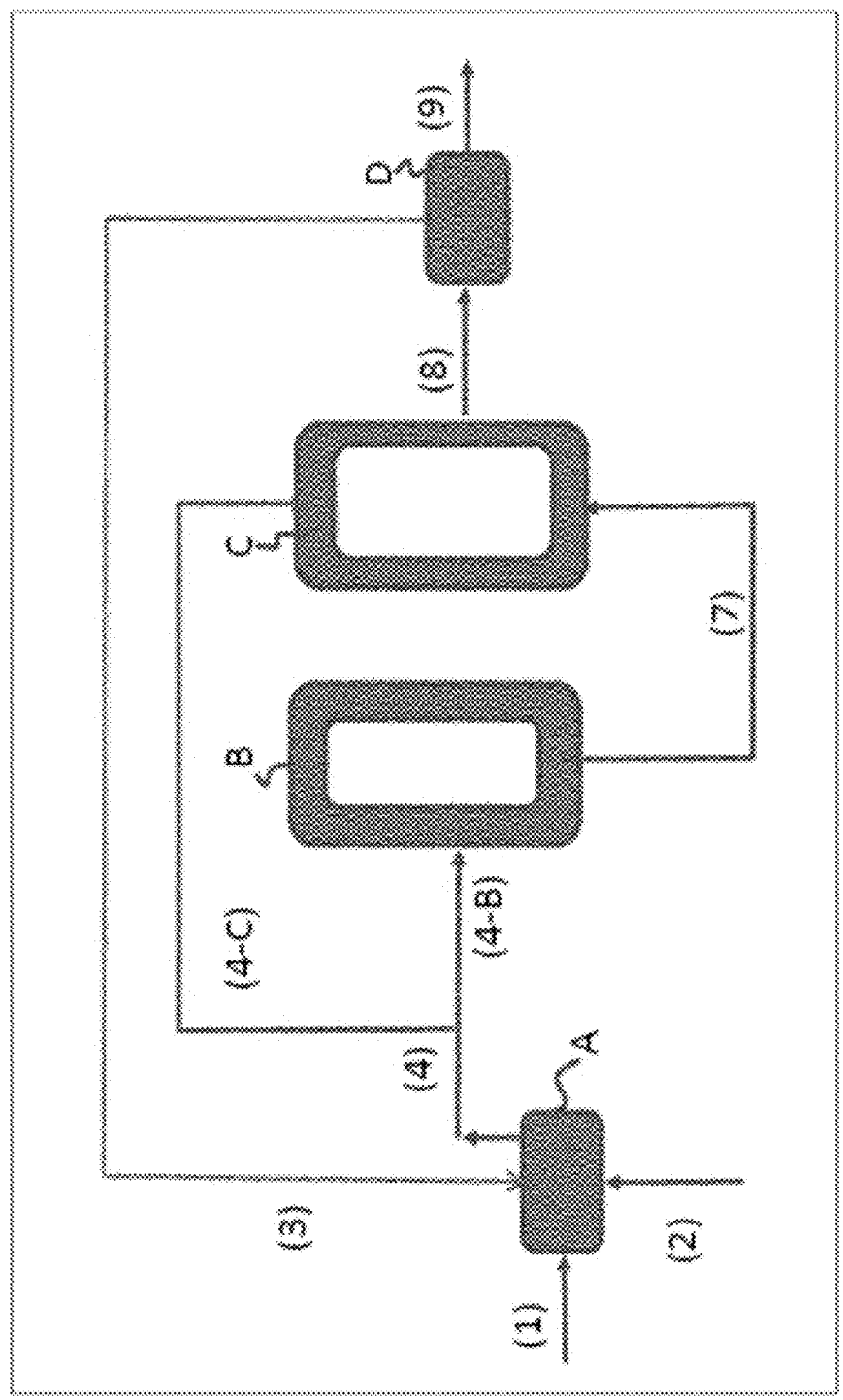

(51) Int. Cl.
*C08L 23/14* (2006.01)
*C08F 2/01* (2006.01)
*C08F 2/12* (2006.01)
*C08F 2/00* (2006.01)
*C08F 2/14* (2006.01)

(52) U.S. Cl.
CPC .................. *C08J 5/18* (2013.01); *C08L 23/14* (2013.01); *C08F 2800/20* (2013.01); *C08J 2323/14* (2013.01)

(56) References Cited

U.S. PATENT DOCUMENTS

| | | | |
|---|---|---|---|
| 4,226,963 | A | 10/1980 | Giannini et al. |
| 4,347,160 | A | 8/1982 | Epstein et al. |
| 4,382,019 | A | 5/1983 | Greco |
| 4,435,550 | A | 3/1984 | Ueno et al. |
| 4,465,782 | A | 8/1984 | McKenzie |
| 4,472,524 | A | 9/1984 | Albizzati |
| 4,473,660 | A | 9/1984 | Albizzati et al. |
| 4,522,930 | A | 6/1985 | Albizzati et al. |
| 4,530,912 | A | 7/1985 | Pullukat et al. |
| 4,532,313 | A | 7/1985 | Matlack |
| 4,560,671 | A | 12/1985 | Gross et al. |
| 4,581,342 | A | 4/1986 | Johnson et al. |
| 4,657,882 | A | 4/1987 | Karayannis et al. |
| 5,539,067 | A | 7/1996 | Parodi et al. |
| 5,618,771 | A | 4/1997 | Parodi et al. |

FOREIGN PATENT DOCUMENTS

| | | | |
|---|---|---|---|
| EP | 45977 | A2 | 2/1982 |
| EP | 0250229 | A1 | 12/1987 |
| EP | 261027 | A1 | 3/1988 |
| EP | 491566 | A2 | 6/1992 |
| EP | 0501741 | A1 | 9/1992 |
| EP | 591224 | A1 | 4/1994 |
| EP | 0752431 | A2 | 1/1997 |
| EP | 0773235 | A1 | 5/1997 |
| EP | 1270651 | A1 | 1/2003 |
| EP | 2558508 | A1 | 2/2013 |
| EP | 2610271 | A1 | 7/2013 |
| EP | 2610272 | A1 | 7/2013 |
| WO | WO-87/07620 | A1 | 12/1987 |
| WO | WO-92/19653 | A1 | 11/1992 |
| WO | WO-92/19658 | A1 | 11/1992 |
| WO | WO-92/19659 | A1 | 11/1992 |
| WO | WO-92/21705 | A1 | 12/1992 |
| WO | WO-93/11165 | A1 | 6/1993 |
| WO | WO-93/11166 | A1 | 6/1993 |
| WO | WO-93/19100 | A1 | 9/1993 |
| WO | WO-95/32994 | A1 | 12/1995 |
| WO | WO-97/36939 | A1 | 10/1997 |
| WO | WO-98/12234 | A1 | 3/1998 |
| WO | WO-98/058971 | A1 | 12/1998 |
| WO | WO-99/33842 | A1 | 7/1999 |
| WO | WO-2003/000754 | A1 | 1/2003 |
| WO | WO-2003/000757 | A1 | 1/2003 |
| WO | WO-2004/02911 | A1 | 4/2004 |
| WO | WO-2006/104297 | A1 | 10/2006 |
| WO | WO-2007/137853 | A1 | 12/2007 |
| WO | WO-2009/019169 | A1 | 2/2009 |
| WO | WO-2012/007430 | A1 | 1/2012 |
| WO | WO-2015/082402 | A1 | 6/2015 |
| WO | WO-2015/107020 | A1 | 7/2015 |
| WO | WO 2017/114840 | | 7/2017 |

OTHER PUBLICATIONS

International Preliminary Report on Patentability dated Jul. 3, 2018 by the International Searching Authority for International Application No. PCT/EP2016/082725, filed on Dec. 31, 2015 and published as WO 2017/114840 on Jul. 6, 2017 (Applicant—BOREALIS AG) (5 Pages).

PROCESS FOR PREPARING PROPYLENE COPOLYMER COMPOSITIONS

CROSS-REFERENCE TO RELATED APPLICATIONS

This application is a U.S. National Phase of International Application No. PCT/EP2016/082725, filed on Dec. 27, 2016, which claims priority to European Patent Application No. 15203225.6, filed Dec. 31, 2015, each of which are hereby incorporated by reference in their entirety.

The present invention relates to an olefin polymerization process comprising reacting propylene and α-olefin of 4 to 10 C atoms and optionally ethylene in a multistage process in the presence of a Ziegler-Natta catalyst to form a propylene copolymer composition wherein the polymer is bimodal with respect to at least the content of $C_4$ to $C_{10}$ α-olefin comonomer. Further, the invention is directed to the propylene copolymer compositions being bimodal with respect to at least the content of $C_4$ to $C_{10}$ α-olefin comonomer and use of said propylene copolymer compositions for producing articles.

Good comonomer incorporation, i.e. good comonomer conversion and comonomer response are normally desired to reach better process economics and to avoid the need of extensive after-treatment steps for removing residual hydrocarbons. Especially higher monomers containing four or more carbon atoms are known to be less reactive and thus cause problems in the process and in polymer properties, e.g. as higher volatile amounts. However, such higher α-olefin monomers in the propylene copolymer compositions result in many advantageous polymer properties.

Polypropylenes are suitable for many applications. It is known that polypropylene comprising comonomer units derived from a higher α-olefin of 4 to 10 C atoms (such as 1-butene or 1-hexene) and optionally ethylene-derived comonomer units is useful for preparing polypropylene films, such as blown films, cast films and polymer layers for multilayer films. Among other articles, e.g. flexible packaging is suitably prepared from such polypropylene materials.

Polypropylene having comonomer units of a higher α-olefin of 4 to 10 C atoms and optionally ethylene comonomer units can be prepared in the presence of a Ziegler-Natta catalyst. There have been some attempts to solve some of the problems relating to comonomer conversion as discussed above. E.g. WO2015/107020 discloses a method to increase the catalyst reactivity vs. higher monomers by using specific silanes as external electron donors in order to ensure satisfactory incorporation of higher α-olefins into the propylene polymer. However, bimodality of the polymer with respect to the higher α-olefins is not at all discussed in the document.

Depending on the final application of the polymer, the polypropylene composition is subjected to further process steps such as extrusion or molding steps (e.g. forming films by cast or blow film process, extrusion coating etc.). If the polymer is used as films e.g. in packaging applications, the melting temperature and sealing properties are essential features of the polymer. Generally, the sealing and processability properties of propylene copolymers can be improved by increasing the melting temperature (Tm) of the polymer. However, increased Tm tends to increase the seal initiation temperature (SIT), which is not desired in many packaging applications.

Polymer produced in a multistage process and being bimodal with respect to higher α-olefins would broaden the product window and product properties.

Thus, there is a need to provide a process for producing a bimodal copolymer composition having bimodality especially with respect to higher α-olefins. This would allow control of properties of the copolymer to achieve e.g. desired melting temperature. In a full-scale process configuration comprising two polymerization reactors, e.g. slurry or gas phase reactors, control of the process is a demanding task due to different reactivities of the monomers. However, running the process in such a way that a desired comonomer content, especially content of $C_4$ to $C_{10}$ α-olefin in each process step, i.e. desired bimodality with respect to comonomers, is achieved, faces easily with process operability related problems and e.g. stickiness and swelling problems, especially in process configuration comprising at least to slurry reactors. Especially, such a process results easily in high amount of unreacted higher α-olefins, which are to be removed and/or circulated back to the process. High amount of unreacted monomers needs extra treatment steps, which does not make the process attractive due to problems in running the process. Further, extra treatment steps need more time, are costly and in environmental point of view are not desired.

Thus, there is a need to provide a multistage process comprising at least two polymerization reactors selected from slurry and gas phase reactors or combinations thereof for producing propylene copolymer with at least $C_4$ to $C_{10}$ α-olefin comonomers being bimodal with respect to the content of said $C_4$ to $C_{10}$ α-olefin comonomers, and which process enables good process economics, and at the same time enables desired $C_4$ to $C_{10}$ α-olefin incorporation into the copolymer fractions prepared at each polymerisation stage. In a process having good process economics less $C_4$ to $C_{10}$ α-olefin in the feed liquid comprising monomers is needed to achieve the desired comonomer content and a higher throughput of the process. Further the need of extensive after-treatment steps for removing and/or circulating residual hydrocarbons can be substantially decreased. Especially there is a need to provide a process comprising at least two slurry reactors for producing propylene copolymers as described above.

A multistage process for producing propylene copolymers is as such known and described in numerous patent publications, e.g. in publications as listed below.

WO9858971 discloses propylene compositions comprising a mixture of two different terpolymer compositions. Polymer is produced in a process comprising a combination of slurry and gas phase reactors.

WO2009/019169 discloses a process for producing propylene terpolymer comprising as comonomers ethylene and an alpha-olefin of 4-8 C atoms. Process is carried out in gas-phase reactor comprising two interconnected polymerization zones.

EP2558508 discloses a propylene-ethylene-hexene terpolymer produced in two interconnected fluidized bed reactor.

None of these publications describe problems relating process operability of a process comprising at least two slurry reactors for producing propylene copolymers being bimodal with respect to $C_4$ to $C_{10}$ α-olefin comonomer contents. Solving the problems of the process will result in improved and/or fine-tuned properties of propylene polymer compositions for desired needs, i.e. properties of propylene polymers comprising comonomers of $C_4$ to $C_{10}$ α-olefin and optionally ethylene. Especially, possibility to control the melting temperature of the polymer would be highly desired without changing the overall content of the comonomers, especially $C_4$ to $C_{10}$ α-olefin content.

As indicated above, Ziegler-Natta catalysts are widely used in propylene polymerization processes. Ziegler-Natta catalysts comprise typically a solid Ziegler-Natta catalyst component comprising as essential components compounds of Group 1 to 3 metal and Group 4 to 6 transition metal, an internal electron donor and optionally a compound of Group 13 metal.

Ziegler-Natta catalysts for producing propylene polymers comprise in addition to the solid catalyst component also cocatalysts, typically organoaluminum compounds, and commonly external electron donors.

Thus, it is an object of the present invention to provide a multistage polymerization process comprising at least two polymerisation reactors for producing a propylene copolymer composition comprising comonomer units derived from α-olefin of 4 to 10 C atoms, where the copolymer is bimodal at least with respect to $C_4$ to $C_{10}$ α-olefin comonomer content. The process has good process economics. According to the process of the invention $C_{4-10}$ α-olefin is thus incorporated into the polymer fractions produced in different polymerisation steps in different amounts resulting in propylene copolymer composition having bimodal comonomer composition with respect to the α-olefin of 4 to 10 C atoms. In addition to the $C_4$ to $C_{10}$ α-olefin comonomers, it is also possible to incorporate ethylene into the propylene polymer composition resulting in propylene terpolymer composition. Due to the higher reactivity of ethylene bimodality with respect to ethylene is not demanding to reach in the process.

Further, an object of the present invention is to provide a propylene polymer composition obtainable, preferably obtained by the process of the invention and use of the copolymer composition for producing articles.

According to a first aspect of the present invention, the object is solved by an olefin polymerization process, wherein propylene and $C_4$ to $C_{10}$ α-olefin α-olefin comonomer and optionally ethylene are fed independently, i.e. in different amounts into each polymerization reactor.

Process Description

The propylene polymerization process may in general be a continuous process or a batch process utilising known methods and operating in liquid phase, like slurry phase, optionally in the presence of an inert diluent, or in gas phase or by mixed liquid-gas techniques.

The process of the present invention is a continuous multistage process comprising at least two polymerisation reactors. Especially the process is carried out in at least two slurry reactors, preferably in at least two loop reactors. As catalyst is used solid Ziegler-Natta catalyst.

The essential feature of the process of the invention lies in the specific way of feeding comonomer(s) into the process for producing propylene copolymer with at least $C_4$ to $C_{10}$ α-olefin comonomer, wherein the copolymer is bimodal with respect to at least said $C_4$ to $C_{10}$ α-olefin comonomer.

The process of prior art and process of the present invention is disclosed in detail below referring to the FIGS. 1 and 2.

FIG. 1 describes a typical process configuration in the art for producing propylene copolymers.

Figure 2:
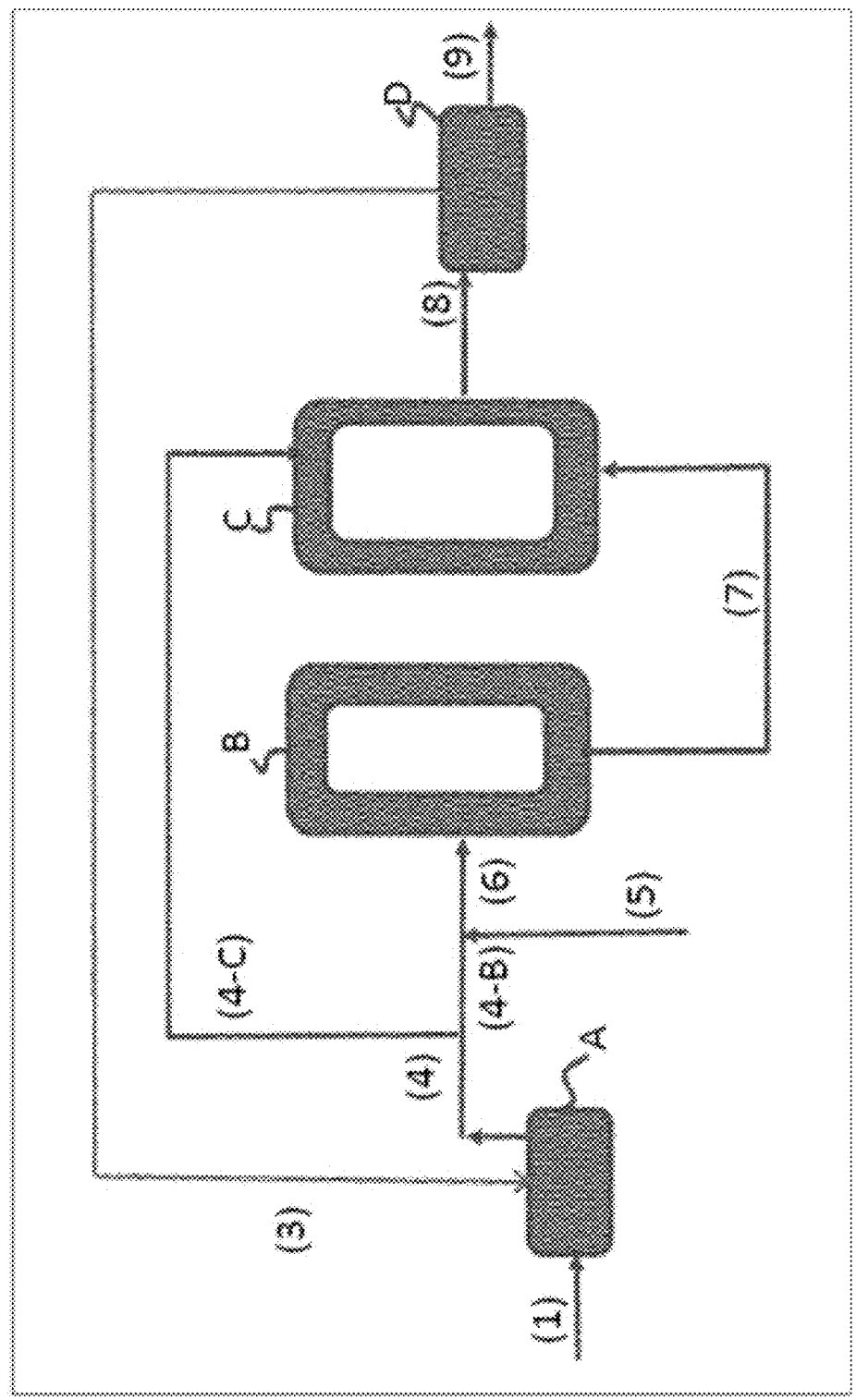

FIG. 2 describes the process of the invention for producing propylene copolymers.

In the following description α-olefin is used to denote α-olefin of 4 to 10 C-atoms, if not otherwise indicated.

In FIGS. 1 and 2 (A) denotes a monomer feed tank, (B) denotes the first slurry polymerization reactor, (C) denotes the second slurry polymerization reactor and (D) denotes a product receiver comprising also a monomer recovery unit.

According to a typical process in the art as described in FIG. 1 fresh propylene monomer (C3) is fed via line (1) and α-olefin and optionally ethylene monomers are fed via line (2) into the monomer feed tank (A). Unreacted ethylene (if any), C3 and α-olefin monomers are circulated from a product receiver (D) back into the monomer feed tank (A) via line (3). The monomer mixture (C3,α-olefin and optional ethylene) out-take from (A), line (4), is divided into two feeds, lines (4-B) and (4-C), which are fed to reactors (B) and (C), respectively. The comonomer feed via (4-B) is higher than the feed via (4-C). Product from the first reactor (B), i.e. a first polymer fraction (P1) with unreacted monomers is transferred from reactor (B) to reactor (C) via line (7). Product mixture from the second reactor (C) is fed via line (8) to the product receiver (D) comprising also monomer recovery unit. The unreacted monomers are separated from the polymer in (D) and circulated back to the monomer feed tank via line (3) and optionally partly removed and final polymer (P) is taken out from (D) via line (9).

According to the inventive process described in FIG. 2 fresh propylene monomer (C3) is fed via line (1) into the monomer feed tank (A). Unreacted ethylene (if any), C3 and α-olefin monomers are circulated from a product receiver (D) back into the monomer feed tank (A) via line (3). No fresh α-olefin monomer is fed to (A). The monomer mixture, (C3 and circulated unreacted monomers from (D)), out-take from (A), line (4) is divided into two parts; a feed, which is fed to reactor (C) via line (4-C) and to feed in line (4-B). Fresh α-olefin monomer feed and optionally ethylene feed are connected to line (4-B) via line (5) and the combined monomer mixture is fed to reactor (B) via line 6. Product from the first reactor (B), i.e. a first polymer fraction (P1) with unreacted monomers is transferred from reactor (B) to reactor (C) via line (7). Product mixture from the second reactor (C) is fed via line (8) to the product receiver (D) comprising also monomer recovery unit. The unreacted monomers are separated from the polymer in (D) and circulated back to the monomer feed tank via line (3) and optionally partly removed and polymer is taken out from (D) via line (9).

Thus, the present invention provides an olefin polymerization process for producing propylene copolymer composition, wherein propylene, $C_4$ to $C_{10}$ α-olefin and optionally ethylene are reacted in the presence of a Ziegler-Natta catalyst in a multistage polymerisation process comprising at least two slurry polymerization reactors, wherein the copolymer composition is bimodal with respect at least to the content of $C_4$ to $C_{10}$ α-olefin and optionally to ethylene, and wherein the process comprises feeding fresh propylene monomer (C3) via line (1) into the monomer feed tank (A), feeding circulated unreacted monomers from a product receiver (D) into (A) via line (3), dividing the monomer mixture from (A) in a feed line (4) into a feed line (4-C), which feeds the monomer mixture to a second reactor (C), and to a feed line (4-B), feeding fresh $C_4$ to $C_{10}$ α-olefin monomer and optionally ethylene into the feed line (4-B) via line (5) forming a combined feed in line (6), feeding the combined monomer mixture via line (6) to the first reactor (B), polymerizing the monomer mixture in the first reactor (B) to produce a first product mixture comprising a first polymer fraction (P1) and unreacted monomers transferring the first product mixture from reactor (B) to the second reactor (C) via line (7), continuing the polymerization in the reactor (C) to produce the second product mixture comprising the second polymer fraction (P2) and unreacted monomers taking the second product mixture with unreacted monomers out from the reactor (C) and feeding the mixture via line (8) to the product receiver (D), separating the unreacted monomers from the second product mixture in the product receiver (D)

circulating at least part of the unreacted monomers back to the monomer feed tank (A) via line (3) and removing the final copolymer composition (P) from (D) via line 9.

Preferably the $C_4$ to $C_{10}$ α-olefin comonomer is an α-olefin comonomer of 4 to 8 C atoms, more preferably an α-olefin comonomer of 4 to 6 C atoms, especially 1-butene.

As indicated above the object of the present invention is to produce propylene copolymers having bimodal comonomer composition at least with respect to the higher α-olefins of 4 to 10 carbon atoms and optionally to ethylene.

Producing propylene copolymers being bimodal with respect to the higher α-olefins content allows production of polymer with desired and beneficial properties. Properties of the final polymer can be further controlled, if desired, by incorporating ethylene into the polymer. As is known in the art, reactivity of ethylene is much higher than reactivity of higher α-olefins, thus getting bimodality with respect to ethylene content is not that demanding in process point of view. Thus, easiest way to get some bimodality would be to apply bimodality only with respect to ethylene content. However, this would not satisfy all the desired needs of final polymer properties. Therefore producing propylene copolymer having bimodality with respect at least to $C_4$ to $C_{10}$ α-olefin comonomer, preferably α-olefin comonomer of 4 to 8 C atoms, more preferably α-olefin comonomer of 4 to 6 C atoms, especially 1-butene, and optionally to ethylene, would expand the propylene copolymer property envelope beyond what would be possible by applying bimodality only in ethylene content.

However, the lower reactivity of higher α-olefins makes the process demanding and causes problems having effect on the whole process. In a process comprising two polymerisation reactors, especially two slurry reactors, the most obvious way to increase bimodality with respect to α-olefin content would be to reduce the α-olefin feed to the first reactor and increase α-olefin feed to the second reactor. However, this would not lead to the best property balance because of the unfavourable production split between the two reactors. If the major part of the copolymer is produced in the $2^{nd}$ reactor, very high comonomer content in the $2^{nd}$ reactor would be needed. This would lead to softening and swelling of the polymer, and resulting also in high risks of fouling and improper operability.

One way, as disclosed in FIG. 1, would be to feed monomers in equal ratios (α-olefin/propylene ratio and ethylene/propylene ratio, if ethylene is used) to both reactors from the monomer tank, and produce a major part of the copolymer in the $1^{st}$ reactor and a minor part in the $2^{nd}$ reactor. This means that, in order to achieve a composition bimodality without risking plant operability, the larger fraction produced in the $1^{st}$ reactor should be the one with the highest comonomer content, while the smaller fraction produced in the $2^{nd}$ reactor needs to be the one having a lower comonomer content. In principle this would be an optimal configuration. However, due to the lower reactivity of α-olefin, all α-olefin fed to the $1^{st}$ reactor will not be consumed but the non-reacted α-olefin monomers are carried over to the second reactor along with the polymer. Thus, the amount of α-olefin fed to the second reactor is higher than the fresh feed from the monomer tank. This configuration leads to the situation where the α-olefin content of the polymer produced in the second reactor is close to the level of α-olefin content of the first reactor. Thus, bimodality of the polymer with respect to α-olefin is not achieved. Unreacted α-olefin monomer, or part of it, is circulated back to the monomer feed tank, and rest is removed. The feed tank contains then fresh α-olefin monomer and monomer circulated from the product receiver. The amount of circulated/removed unreacted monomer is high, which is not satisfactory in technical and process economics point of view.

If it is desired to produce propylene polymer having bimodality with respect to ethylene in the process configuration with two reactors, ethylene needs to be fed only to the first reactor, and the amount of ethylene carried over to the second loop will be very low. This is due to the high reactivity of ethylene as discussed above. In this way, a larger fraction of copolymer produced in the first loop reactor will have lower Tm and thus also lower SIT than the smaller fraction of copolymer produced in the second reactor.

It has now been found by the inventors an improved process for making the propylene copolymer having bimodality with respect to higher α-olefin, i.e. $C_4$ to $C_{10}$ α-olefin, and optionally with respect to ethylene content. The inventive process makes it possible to control the properties of the polymer, e.g. to provide propylene copolymers having higher melting temperature Tm. A further benefit of the process of the invention is that the amount of unreacted higher α-olefin comonomers, which have to be removed and/or circulated back to the process, is decreased compared to the process with similar polymer production rate. This means that less costly and time consuming after treatment steps are needed and the overall process is easier to control. Further, the process operability is improved, e.g. swelling and stickiness problems can be avoided or at least essentially decreased.

The inventive process configuration is described in FIG. 2, which is explained above.

As explained above, a process for achieving satisfactory and desired bimodality is not possible to run using conventional process configuration as described in FIG. 1.

The desired targets are achieved according to the process of the invention by fully independent comonomer feed cycles to the two reactors. I.e. bimodality with respect to higher α-olefin comonomer content and optionally to ethylene content is preferably achieved by feeding fresh comonomers to the first reactor, where a copolymer with at most 12 wt %, preferably at most 10 wt %, of the higher α-olefin comonomer is produced. To the $2^{nd}$ reactor only propylene is fed as fresh monomer, but no fresh comonomers. The fresh propylene feed to the second reactor contains also a small fraction of higher α-olefin comonomer and optionally ethylene with propylene from the recycle flow from the product receiver unit. In the process of the invention the higher α-olefin comonomer concentration in the $2^{nd}$ reactor would be up to 50% lower than in the $1^{st}$ reactor, meaning that the material produced in the $2^{nd}$ reactor will have clearly lower content of the higher α-olefin comonomer than in the polymer fraction from the first reactor and very low ethylene (which is mostly consumed in the first reactor), if ethylene is fed to the first reactor.

Thus, less α-olefin comonomer of 4 to 10 C atoms has to be fed to the polymerization reactor for accomplishing a certain content of α-olefin comonomer of 4 to 10 C atoms in the final polymer and/or less non-reacted α-olefin comonomer of 4 to 10 C atoms has to be removed from the polymer powder.

The content of the $C_4$ to $C_{10}$ α-olefin in the polymer fractions can be further fine-tuned by selecting catalysts based on the strength of the incorporation ability of the catalyst towards higher α-olefins. In the process of the present invention a Ziegler-Natta catalyst comprising a solid Ziegler-Natta catalyst component, a cocatalyst of an organometallic compound and an external electron donor compound is used. Catalysts are described in detail below with preferred embodiments.

Polymerisation

The polymerization is carried out in at least two reactors, preferably in two slurry reactors, more preferably in two loop reactors in liquid propylene/comonomer mixtures at a temperature in the range from 20° C. to 100° C. Preferably, the temperature is the range from 50° C. to 80° C. The pressure is between 20 and 60 bar. The molecular weight of the polymer chains and thereby the melt flow rate of the polypropylene, is regulated by adding hydrogen. The process configuration can comprise in addition to the slurry reactors additional reactors, like at least one gas phase reactor and optionally a pre-polymerisation reactor preceding the actual polymerisation reactors.

The production split (wt-%) between the first and second reactor, i.e. the ratio of the amount of polymer produced in the first and second reactor is generally in the range of 55:45 to 75:25, preferably in the range of 60:40 to 70:30.

The process may also comprise an in-line prepolymerization step. The in-line prepolymerization step can be conducted as bulk slurry polymerization in liquid propylene or propylene/α-olefin mixtures, i.e. the liquid phase mainly comprises propylene and optionally higher α-olefin, with minor amount of other reactants and optionally inert components dissolved therein. The in-line prepolymerization reaction is typically conducted at a temperature of 20 to 50° C., preferably from 10 to 45° C.

If an in-line prepolymerisation step is carried out, it is possible that all catalyst components are introduced to the prepolymerization reactor. However, in principle, it is also possible that only a part of the cocatalyst is introduced into the prepolymerization stage and the remaining part into subsequent polymerization stages.

The catalyst can also be pre-polymerized off-line, e.g. with ethylene, propylene, or vinyl cyclohexane. The off-line pre-polymerization degree (in gram of polymer per gram of catalyst) can be between 0.5 and 100, preferably between 1 and 50.

Hydrogen may be added into the pre- and actual polymerization stages to control the molecular weight of the polymer as is known in the art. Further, an antistatic additive may be used to prevent the particles from adhering to each other or to the walls of the reactor. The precise control of the (pre)polymerization conditions and reaction parameters is within the skill of the art.

Catalyst Description

A Ziegler-Natta type catalyst typically used in the present invention comprises a stereospecific, solid high yield Ziegler-Natta catalyst component comprising compounds of a transition metal of Group 4 to 6 of IUPAC, preferably a Group 4 metal compound, more preferably a titanium compound, especially titanium tetrachloride, a Group 1 to 3 metal compound, preferably Group 2 metal compound, and especially a magnesium compound, and optionally a Group 13 metal compound, preferably an aluminum compound. The aluminum compound can be suitable be selected from aluminum alkyl, aluminum alkyl halide, aluminum alkoxide, aluminum alkyl alkoxide or aluminum alkoxyhalide compounds.

The solid catalyst component usually comprises also an internal electron. Suitable internal electron donors are, among others, 1,3-diethers, (di)esters of aliphatic or aromatic (di)carboxylic acids, like phthalates, maleates, substituted maleates (e.g. citraconates), benzoates, glutarates, cyclohexene-1,2-dicarboxylates and succinates or derivatives and mixtures thereof. The internal electron donor is understood to mean a donor compound being part of the solid catalyst component, i.e. added during the synthesis of the catalyst component. The terms internal electron donor and internal donor have the same meaning in the present application and the terms are interchangeable.

Catalyst may be a supported catalyst, wherein the support is particulate support material, such as inorganic oxide, like silica or alumina. Further, the solid support may be magnesium halide based support. It is also possible that catalysts components are not supported on an external support, but solid catalyst is prepared by emulsion-solidification method or by precipitation method.

In addition to the solid catalyst component the catalyst comprises typically cocatalyst(s) as well external electron donor(s).

The cocatalyst are typically organometallic compounds of Group 13 metal, especially aluminum Typical examples of cocatalysts comprise at least one compound selected from a trialkylaluminum, a dialkyl aluminum chloride, alkyl aluminum dichloride, an alkyl aluminum sesquichloride, or any mixture thereof. Preferably, alkyl is an alkyl of 1 to 4 C atoms, preferably ethyl or isobutyl. Commonly used cocatalyst is triethyl aluminum.

Suitable external electron donors used in propylene polymerisation process are well known in the art and include ethers, ketones, amines, alcohols, phenols, phosphines and silanes. Silane type external donors known in the art are typically organosilane compounds containing Si—OCOR, Si—OR, or Si—$NR_2$ bonds, having silicon as the central atom, where R is an alkyl, alkenyl, aryl, arylalkyl or cycloalkyl with 1-20 carbon atoms are. The terms external electron donor and external donor have the same meaning in the present application and are interchangeable.

Examples of suitable supported catalysts and catalyst components are disclosed in among others, in WO 87/07620, WO 92/21705, WO 93/11165, WO 93/11166, WO 93/19100, WO 97/36939, WO 98/12234, WO 99/33842, WO 92/19659, WO 92/19653, WO 92/19658, U.S. Pat. Nos. 4,382,019, 4,435,550, 4,465,782, 4,473,660, 4,560,671, 5,539,067, 5,618,771, EP45975, EP45976, EP45977, WO 95/32994, U.S. Pat. Nos. 4,107,414, 4,186,107, 4,226,963, 4,347,160, 4,472,524, 4,522,930, 4,530,912, 4,532,313, 4,657,882, 4,581,342, 4,657,882.

The solid catalyst particles may not be supported on an external support, i.e. the solid catalyst is free of any external support material, like silica or $MgCl_2$, but the catalyst is self-supported. Such catalysts are prepared by emulsion-solidification method or by precipitation method. According to the emulsion-solidification method, the dispersed phase in the form of liquid droplets of the emulsion, forms the catalyst part, which is transformed to solid catalyst particles during the solidification step. The solid catalyst component prepared by the emulsion-solidification method is typically in the form of spherical particles having compact structure and low surface area. Further, this catalyst component is featured by an uniform distribution of catalytically active sites throughout the catalyst particles.

Detailed description of preparation of solid catalyst components prepared without any external support or carrier material are disclosed in WO-A-2003/000757, WO-A-2003/000754, WO-A-2004/029112 and WO2007/137853, WO 2012/007430, EP2610271, EP 261027 and EP2610272 which are incorporated here by reference.

In propylene (co)polymerization process as external electron donors are typically used alkoxy silane type compounds, which are as such known and described in patent literature. E.g. EP0250229, WO2006104297, EP0773235, EP0501741 and EP0752431 disclose different alkoxy silanes for polymerizing propylene.

In the Ziegler-Natta catalyst of the present invention, the molar ratio of aluminum (from the organometallic cocatalyst) to the transition metal of Group 4 to 6, preferably titanium (from the solid catalyst component), can vary over a broad range. Preferably, the molar ratio of aluminum to Ti in the Ziegler-Natta catalyst is from 10 to 1000, more preferably from 50 to 500.

In the Ziegler-Natta catalyst of the present invention, the molar ratio of the external donor to the transition metal of Group 4 to 6, preferably titanium (from the solid catalyst component) can vary over a broad range. Preferably, the molar ratio of the external donor to titanium in the Ziegler-Natta catalyst is from 1 to 100, more preferably from 5 to 50.

Polymer Properties

The final propylene polymer composition of the present invention comprises $C_4$ to $C_{10}$ α-olefin, preferably $C_4$ to $C_8$ α-olefin, more preferably $C_4$ to $C_6$ α-olefin, most preferably 1-butene-derived comonomer units in an amount of from 1 wt-% to 12 wt-%, preferably from 2 wt-% to 10 wt-%, more preferably from 3 wt-% to 9 wt-%, still more preferably from 4 wt-% to 8 wt-%.

The essential feature of the present invention is to produce propylene copolymer having bimodality with respect to the content of the $C_4$ to $C_{10}$ α-olefin α-olefin. This means that the amount of said α-olefin in the polymer produced in the first reactor (first fraction) should differ from the content of the second polymer fraction produced in the second reactor. The polymer produced according to the invention has a higher content of $C_4$ to $C_{10}$ α-olefin in the first polymer fraction, this being in the range of 4 to 12 wt-%, preferably in the range of 6 to 10 wt-%. The $C_4$ to $C_{10}$ α-olefin content in the second polymer fraction is approximately 35-65 wt-% of the amount in the first fraction. I.e. the weight ratio of $C_4$ to $C_{10}$ α-olefin content in the second polymer fraction/$C_4$ to $C_{10}$ α-olefin content in the first polymer fraction is in the range of 0.35 to 0.65, preferably in the range of 0.40 to 0.63, like 0.45 to 0.62. Thus the amount of $C_4$ to $C_{10}$ α-olefin in the second polymer fraction is in the range of 1.4 to 7.8 wt-%, preferably in the range of 2 to 6 wt-%.

The $C_4$ to $C_{10}$ α-olefin is preferably $C_4$ to $C_8$ α-olefin, more preferably $C_4$ to $C_6$ α-olefin, and most preferably 1-butene ($C_4$) comonomer thorough the present invention.

The ethylene amount in the final polymer is in the range of 0 to 3 wt-%.

It has to be noted that the amount of $C_4$ to $C_{10}$ α-olefin content in the second fraction is not possible to be measured, but is calculated based on the amount of $C_4$ to $C_{10}$ α-olefin content in the first fraction and in the final polymer and on the production split. The calculation method is described in the experimental part.

Thus the propylene polymer produced is most preferably a propylene-1-butene copolymer or a propylene/1-butene/ethylene terpolymer.

Melting temperature (Tm) of propylene-1-butene copolymers produced by the method of the present invention is in the range of 140° C. to 155° C., preferably in the range of 145° C. to 153° C. If ethylene is incorporated as additional comonomer, the final melting temperature can be fine-tuned by the amount of ethylene.

The melt flow rate, $MFR_2$, of the final polymer can vary in wide ranges and can be controlled e.g. by the amount of hydrogen fed to the process as is well known in the art. Typical $MFR_2$(ISO1133, measured at 230° C. with 2.16 kg load) is in the range of 0.5 to 100 g/10 min, like 1.0 to 50 g/10 min. The desired $MFR_2$ is defined by the requirement of the final application.

According to the inventive process the most important beneficial polymer properties and beneficial process features can be summarized to be:

Bimodality with respect to the higher α-olefin, i.e. where the polymer fraction of the $2^{nd}$ reactor (P2) has lower content of higher α-olefin than the first polymer fraction (P1) will result in higher melting point of the final polymer, i.e. being at least ≥140° C. The amount of unreacted higher α-olefin monomer in the stream entering and leaving the polymer receiving unit is decreased. Production rate is increased due to lower amount of unreacted higher α-olefin monomer in the polymer powder, whereby smaller polymer after treatment capacity is needed in the process. Polymer bimodality with respect to at least $C_4$ to $C_{10}$ α-olefin content makes it possible to broaden the process window and product properties allowing use of the polymer in wider range of applications.

By proper selection of catalysts the above beneficial properties and features of the polymers and process can be further fine-tuned and improved.

According to a further aspect, the present invention relates to a propylene polymer composition (polypropylene), which is obtainable by the process as described above.

With regard to the preferred properties of the propylene polymer composition, reference can be made to the statements made above.

According to a further aspect, the present invention relates to articles prepared form the propylene polymer composition of the invention. Typical examples of articles are e.g. films comprising the propylene polymer composition as described above. The film can be oriented, either mono-axially or bi-axially. Alternatively, the film can be non-oriented. The propylene polymer composition can be processed to a film by commonly known methods such as blow moulding, cast moulding, and extrusion moulding. Such films are suitable to be used in packaging applications.

With regard to the preferred features of the process, catalyst and polymer composition reference is be made to the statements provided above.

The present invention will now be described in further detail by the following Examples.

EXAMPLES

Measuring Methods

If not otherwise indicated, the parameters mentioned in the present application are measured by the methods outlined below.

Comonomer Content by IR Spectroscopy

The content of 1-butene was measured by quantitative Fourier transform infrared spectroscopy (FTIR), as described in the following.

Before measuring, the stabilized powder was pressed in a press as follows:

Press Settings to Homogenise the Material:

press temperature: 210° C.

melting time: 90 sec
cooling rate: 12° C./min
de-moulding temperature: between 35 and 45° C.

| step | 1 | 2 (cooling) |
|---|---|---|
| duration (sec.) | 90 | 900 |
| Temperature (° C.) | 210 | 30 |
| pressure (bar) | 0 | 0 |

Press Settings for IR Plate:
press temperature: 210° C.
melting time: 45 sec
press pressure: 3 steps (10/30/90 bar)
cooling rate: 12° C./min
de-moulding temperature: between 35 and 45° C.

| step | 1 | 2 | 3 | 4 | 5 (cooling) |
|---|---|---|---|---|---|
| duration (sec.) | 45 | 15 | 15 | 15 | 900 |
| Temperature (° C.) | 210 | 210 | 210 | 210 | 30 |
| pressure (bar) | 0 | 10 | 30 | 90 | 90 |

The films had a thickness of between 260 and 300 μm

Spectra have been recorded in transmission mode. Relevant instrument settings include a spectral window of 5000 to 400 wave-numbers ($cm^{-1}$), a resolution of 2.0 $cm^{-1}$ and 16 scans. The butene content of the propylene-butene copolymers was determined using the baseline corrected peak maxima of a quantitative band at 767 $cm^{-1}$, with the baseline defined from 1945 to 625 $cm^{-1}$. The comonomer content in mol % was determined using a film thickness method using the intensity of the quantitative band $I_{767}$ (absorbance value) and the thickness (T, in cm) of the pressed film using the following relationship:

$$\text{mol \% } C4 = [(I_{767}/T) - 1.8496]/1.8233 \quad \text{(Equation 1)}$$

In the case of C3C4C2 terpolymers, the comonomer content was determined using the baseline corrected peak maxima of the quantitative bands at 767 $cm^{-1}$ for butene and at 732 $cm^{-1}$ for ethylene with the baseline defined from 1945 to 625 $cm^{-1}$. The comonomer content in mol % was determined using a film thickness method using the intensity of the quantitative bands ($I_{767}$ and $I_{732}$ absorbance values) and the thickness (T, in cm) of the pressed film using the following relationships:

$$\text{mol \% } C4 = [(I_{767}/T) - 3.1484]/1.5555 \quad \text{(Equation 2)}$$

$$\text{mol \% } C2 = [(I_{732}/T) - 0.6649]/1.2511 \quad \text{(Equation 3)}$$

Calculation of the 1-Butene Content of the Propylene Copolymer Fraction (P2):

$$\frac{C(P) - w(P1) \times C(P1)}{w(P2)} = C(P2)$$

wherein
w(P1) is the weight fraction of the propylene copolymer fraction (P1), i.e. the product of the first reactor (B),
w(P2) is the weight fraction of the propylene copolymer fraction (P2), i.e. of the polymer produced in the second reactor (C),
C(P1) is the 1-butene content [in wt.-%] of the propylene copolymer fraction (P1), i.e. of the product of the first reactor (B),
C(P) is the 1-butene content [in wt.-%] of the product obtained from the second reactor (C), i.e. the final propylene copolymer composition (P),
C(P2) is the calculated 1-butene content [in wt.-%] of the propylene terpolymer fraction (P2).

Ethylene or any other C4 to C10 α-olefin content in the second reactor can be calculated in the same manner.

Amount of Xylene Solubles (XS, wt-%)
The amount of xylene solubles was determined at 25° C. according ISO 16152; first edition; 2005 Jul. 1.

$MFR_2$
Melt flow rate $MFR_2$ was measured according to ISO 1133 (230° C., 2.16 kg load).

Melting Temperature
The melting points (Tm) were determined according to ISO standards 11357 on a DSC Q2000 TA Instrument, by placing a 5-7 mg polymer sample, into a closed DSC aluminum pan, heating the sample from −10° C. to 225° C. at 10° C./min, holding for 10 min at 225° C., cooling from 225° C. to −10° C., holding for 5 min at −10° C., heating from −10° C. to 225° C. at 10° C./min. The reported values are those of the peak of the endothermic heat flow determined from the second heating scan.

Polymerisation Experiments
Catalysts:
The following Ziegler-Natta catalyst components were used in the Examples:
Catalyst 1
$MgCl_2$ supported catalyst
First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the catalyst was filtered and dried. Catalyst and its preparation concept is described in general e.g. in patent publications EP491566, EP591224 and EP586390. Ti content in the catalyst component was 1.9 wt-%.

Catalyst 2
3.4 litre of 2-ethylhexanol and 810 ml of propylene glycol butyl monoether (in a molar ratio 4/1) were added to a 20 l reactor. Then 7.8 litre of a 20% solution in toluene of BEM (butyl ethyl magnesium) provided by Crompton GmbH, were slowly added to the well stirred alcohol mixture. During the addition the temperature was kept at 10° C. After addition the temperature of the reaction mixture was raised to 60° C. and mixing was continued at this temperature for 30 minutes. Finally after cooling to room temperature the obtained Mg-alkoxide was transferred to a storage vessel.

21.2 g of Mg alkoxide prepared above was mixed with 4.0 ml bis(2-ethylhexyl) citraconate for 5 min. After mixing the obtained Mg complex was used immediately in the preparation of the catalyst component.

19.5 ml of titanium tetrachloride was placed in a 300 ml reactor equipped with a mechanical stirrer at 25° C. Mixing speed was adjusted to 170 rpm. 26.0 g of Mg-complex prepared above was added within 30 minutes keeping the temperature at 25° C. 3.0 ml of Viscoplex® 1-254 and 1.0 ml of a toluene solution with 2 mg Necadd 447™ was added. Then 24.0 ml of heptane was added to form an emulsion. Mixing was continued for 30 minutes at 25° C., after which the reactor temperature was raised to 90° C. within 30 minutes. The reaction mixture was stirred for a further 30 minutes at 90° C. Afterwards stirring was stopped and the reaction mixture was allowed to settle for 15 minutes at 90° C. The solid material was washed 5 times: Washings were made at 80° C. under stirring for 30 min with 170 rpm. After stirring was stopped the reaction mixture was allowed to settle for 20-30 minutes and followed by siphoning.

Wash 1: Washing was made with a mixture of 100 ml of toluene and 1 ml donor
Wash 2: Washing was made with a mixture of 30 ml of TiCl4 and 1 ml of donor.
Wash 3: Washing was made with 100 ml of toluene.
Wash 4: Washing was made with 60 ml of heptane.
Wash 5: Washing was made with 60 ml of heptane under 10 minutes stirring.

Afterwards stirring was stopped and the reaction mixture was allowed to settle for 10 minutes while decreasing the temperature to 70° C. with subsequent siphoning, followed by $N_2$ sparging for 20 minutes to yield an air sensitive powder. Ti content was 3.76 wt-%, except in comparative example 15 it was 4.10 wt-%.

As external donors the following donors were used:
D: Dicyclopentyl dimethoxy silane, CAS no 126990-35-0
D1 trimethoxy(1,1,2-trimethylpropyl) silane, CAS no 142877-45-0
In all Examples, triethylaluminium (TEA) was used as the organometallic cocatalyst.

Polymerisation Process
Propylene-1-butene Copolymerisation

In the following examples processes for producing propylene-1-butene copolymers are disclosed in order to show how the bimodality with respect to the higher α-olefin can be reached with a fluent process configuration.

In the present examples no ethylene was used in the process. Ethylene can be fed independently to the desired step, preferably to the first reactor. Due to the high reactivity of ethylene substantially all of the fed ethylene is consumed in the first reactor, whereby bimodality with respect to ethylene is easily reached. By the amount of ethylene polymer properties, like the melting temperature of the final polymer can be fine-tuned.

The polymerisations were carried in a process configuration as described in FIG. 1 (comparative example) and in FIG. 2 (inventive example). Both reactors are loop reactors of volumes 40 m³. Reactor B is Loop 1 and reactor C is Loop 2. As higher α-olefin comonomer was used 1-butene. Monomer feeds and polymer compositions are disclosed in Table 1. CE1 is a comparative example and IE1 is an inventive example.

Temperature in the reactors B (Loop 1) and C (Loop 2) was 65° C., and pressure 40 bar.

Production split between reactors 1 and 2 was 65/35.

C4 in the tables indicates 1-butene monomer and P1 the first polymer fraction of Loop 1 (reactor B), P2 the second polymer fraction of Loop 2 (reactor C) and P the final polymer mixture. Polymer data of Loop 2 are based on calculations. Liq in the table indicates the liquid propylene and 1-butene monomers (C3+C4) in the feeds.

TABLE 1

Polymerisation and product data

| | CE1 | IE1 |
|---|---|---|
| Cat/ext. donor | Cat1/D | Cat1/D |
| C4 in out-take 4 (t/h) | 18.9 | 3.0 |
| Liq in out-take 4 (t/h) | 75.0 | 75.0 |
| C4 in feed line 4-C (t/h) | 5.9 | 1.1 |
| Liq in feed line 4-C (t/h) | 23.2 | 27.7 |
| C4 in feed line 4-B (t/h) | 13.0 | 1.9 |
| Liq in feed line 4-B (t/h) | 51.8 | 47.3 |
| C4 in feed line 5 (t/h) | — | 10.0 |
| C4 in feed line 6 (t/h) | — | 11.9 |
| Liq in feed line 6 (t/h) | — | 47.3 |
| C4 in the transfer line 7(t/h) | 11.2 | 10.2 |
| Liq in the transfer line 7(t/h) | 31.1 | 28.4 |
| Product of Loop 1 | | |
| Product (t/h) | 20.7 | 18.9 |
| C4 in P1 (wt-%) | 9.0 | 9.0 |
| C4/Liq (wt-%) | 36.0 | 36.0 |
| Product of Loop 2 | | |
| C4 in P2 (calc) wt-% | 7.7 | 5.6 |
| C4 in Liq wt-% | 30.9 | 20.8 |
| Final product | | |
| P in out-take line 8 (t/h) | 30.0 | 30.0 |
| C4 in P wt-% | 8.6 | 7.7 |
| C4 in in out-take line 8 (t/h) | 13.9 | 9.1 |

As can be seen from table 1, bimodality with respect to 1-butene is higher in the polymer produced by the inventive process and the amount of the unreacted 1-butene of the final product is clearly lower in the inventive process than in the comparative process.

Corresponding polymerisations were done using catalyst 2 with donor D or D1 as follows: IE2—cat2/D, CE2—cat2/D, IE3—cat2/D1, CE3—cat2/D1

Amount of added fresh C4 into the first reactor is dependent on the amount of C4 coming from the recycling line. The amount of C4 feed is controlled to a level, where C4 amount in the polymer of the Loop 1 is 9 wt-% Summary of the results of IE1 to IE3 and CE1 to CE3 is disclosed in Table 2.

TABLE 2

C4 amounts in C4 + C3 monomer mixtures and in polymers

| Example | C4/Liq in Loop 1/wt % | C4/Liq in Loop 2/wt % | C4 in P1/ wt % | C4 in P2/ wt %* | C4 in final P/ wt-% | C4 in P2/ C4 in P1/ wt %/ wt % | Tm/ ° C. |
|---|---|---|---|---|---|---|---|
| CE1 | 36.0 | 30.9 | 9.0 | 7.7 | 8.8 | 0.86 | |
| IE1 | 36.0 | 20.8 | 9.0 | 5.6 | 7.7 | 0.62 | 151 |
| CE2 | 28.0 | 23.1 | 9.0 | 7.6 | 8.5 | 0.84 | |
| IE2 | 27.3 | 15.5 | 9.0 | 5.0 | 7.6 | 0.55 | 151 |
| CE3 | 22.0 | 17.3 | 9.0 | 6.9 | 8.2 | 0.77 | |
| IE3 | 22.0 | 11.9 | 9.0 | 4.9 | 7.6 | 0.54 | 149 |

*calculated

As can be seen from table 2, 1-butene amount in polymer of the second reactor is clearly lower in inventive examples than in comparative examples. The weight ratio of C4 in P2/C4 in P1 (wt-%/wt-%) is 0.62 or less in all inventive examples, whereas in comparative examples the ratio is 0.77 or higher.

The invention claimed is:
1. An olefin polymerization process for producing a propylene copolymer composition (P), wherein propylene, $C_4$ to $C_{10}$ α-olefin and optionally ethylene are reacted in the presence of a Ziegler-Natta catalyst in a multistage polymerization process comprising at least two slurry polymerization reactors, wherein the copolymer composition is bimodal with respect to the content of $C_4$ to $C_{10}$ α-olefin and, if present, to ethylene, and wherein the process comprises feeding a fresh propylene monomer (C3) via a first line (1) into a monomer feed tank (A), feeding circulated unreacted monomers from a product receiver (D) into the monomer feed tank (A) via a third line (3), dividing a monomer mixture from the monomer feed tank (A) in a fourth feed line (4) into a first divided fourth feed line (4-C), which feeds the monomer mixture to a second reactor (C), and to a second divided fourth feed line (4-B) which feeds to a first reactor (B), feeding a fresh C4 to C10 α-olefin monomer and optionally ethylene into the second divided fourth feed line (4-B) via a fifth line (5) forming a second combined monomer mixture feed in a sixth line (6), feeding the second combined monomer mixture via the sixth line (6) to the first reactor (B), polymerizing the second monomer mixture in the first reactor (B) to produce a first product mixture comprising a first polymer fraction (P1) and unreacted monomers, transferring the first product mixture from the first reactor (B) to the second reactor (C) via a seventh line (7), continuing the polymerization in the second reactor (C) to produce a second product mixture comprising a second polymer fraction (P2) and unreacted monomers, taking the second product mixture with unreacted monomers out from the second reactor (C) and feeding the second product mixture via an eighth line (8) to the product receiver (D), separating the unreacted monomers from the second product mixture in the product receiver (D), circulating at least part of the unreacted monomers back to the monomer feed tank (A) via the third line (3), and removing a final copolymer composition (P) from the product receiver (D) via a ninth line (9).

2. The process according to claim 1, wherein the polymerization reactors are loop reactors.

3. The process of claim 1, wherein the $C_4$ to $C_{10}$ α-olefin comprises $C_4$ to $C_8$ α-olefin.

4. The process of claim 1, wherein the weight ratio of the amount of the polymer produced in the first and second reactor is in the range of 55:45 to 75:25.

5. The process of claim 1, wherein the $C_4$ to $C_{10}$ α-olefin in the first polymer fraction (P1), is present in the range of 4 to 12 wt-%.

6. The process of claim 1, wherein the weight ratio of $C_4$ to $C_{10}$ α-olefin in the second polymer fraction (P2) to $C_4$ to $C_{10}$ α-olefin in the first polymer fraction (P1) is in the range of 0.35 to 0.65.

7. The process of claim 1, wherein the $C_4$ to $C_{10}$ α-olefin in the final propylene copolymer composition (P) is present in the range of 1 to 12 wt %.

8. The process of claim 1, wherein ethylene in the final propylene copolymer composition (P) is present in the range of 0 to 3 wt %.

9. The process of claim 1, wherein a polymerization temperature is in the range of 50 to 80° C.

10. The process of claim 1, wherein the process comprises an in-line pre-polymerization step.

11. The process of claim 1, wherein the Ziegler-Natta catalyst comprises a $MgCl_2$ supported catalyst component or a self-supported catalyst component prepared by an emulsion-solidification method or by a precipitation method.

12. The process of claim 11, wherein the catalyst comprises a cocatalyst of a compound of Group 13 metal and an external donor.

13. The process of claim 1, wherein the $C_4$ to $C_{10}$ α-olefin comprises $C_4$ to $C_6$ α-olefin.

14. The process of claim 1, wherein the C4 to $C_{10}$ α-olefin comprises 1-butene.

15. The process of claim 1, wherein the weight ratio of the amount of the polymer produced in the first and second reactor is in the range of 60:40 to 70:30.

16. The process of claim 12, wherein the cocatalyst comprises aluminum.

17. The process of claim 12, wherein the external donor comprises a silane compound.

* * * * *